(12) United States Patent
Takao (10) Patent No.: US 8,334,936 B2
(45) Date of Patent: Dec. 18, 2012

(54) TELEVISION, PEDESTAL, AND ELECTRONIC DEVICE

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 13/049,801

(22) Filed: Mar. 16, 2011

(65) Prior Publication Data

US 2011/0228176 A1   Sep. 22, 2011

(30) Foreign Application Priority Data

Mar. 17, 2010   (JP) ................................. 2010-061535

(51) Int. Cl.
*H04N 5/64* (2006.01)
*B65D 63/00* (2006.01)
(52) U.S. Cl. ........................................ 348/836; 248/499
(58) Field of Classification Search ........................ None
See application file for complete search history.

(56) References Cited

U.S. PATENT DOCUMENTS

| | | | | |
|---|---|---|---|---|
| 7,690,617 | B2 * | 4/2010 | Takao | 248/499 |
| 2006/0221263 | A1 * | 10/2006 | Ogawa et al. | 348/794 |
| 2009/0122219 | A1 * | 5/2009 | Miyayama | 349/58 |
| 2010/0320886 | A1 * | 12/2010 | Sung et al. | 312/245 |

FOREIGN PATENT DOCUMENTS

| | | |
|---|---|---|
| JP | 2007-086647 A | 4/2007 |
| JP | 2007-322512 A | 12/2007 |
| JP | 2008-160236 A | 7/2008 |
| JP | 2008 225425 | 9/2008 |

OTHER PUBLICATIONS

Reasons for Rejection for Japanese Patent Application 2010-061535 mailed May 10, 2011.

* cited by examiner

*Primary Examiner* — Nhon Diep
(74) *Attorney, Agent, or Firm* — Knobbe, Martens Olson & Bear LLP (57) ABSTRACT

According to one embodiment, a television includes a display, a supporting member, a cover member and an attaching member. The display has a display screen which displays an image. The supporting member supports the display. The cover member is attached the supporting member. The attaching member consists of parts different from those of the supporting member. The attaching member is attached to the cover member at a position that is different from a position at which the supporting member is attached. And an anti-topple restraint is attached to the attaching member.

8 Claims, 13 Drawing Sheets

TELEVISION, PEDESTAL, AND ELECTRONIC DEVICE

CROSS-REFERENCE TO RELATED APPLICATIONS

This application is based upon and claims the benefit of priority from Japanese Patent Application No. 2010-061535, filed Mar. 17, 2010; the entire contents of which are incorporated herein by reference.

FIELD

Embodiments described herein relate generally to a television comprising an anti-topple restraint, a pedestal, and an electronic device comprising the anti-topple restraint.

BACKGROUND

A flat-screen television, such as a liquid crystal television, has a detachable pedestal which can be dispensed with when it is desired to install the television on a wall. However, when the television is to be seated on, for example, a television base, the pedestal is used to support the television on the seating surface of the base.

The anti-topple restraint is provided on the pedestal to prevent the television from being toppled by, for example, an earthquake. For example, the anti-topple restraint takes the form of a restraining strap which is secured to the television base, or an eye through which a restraining wire passes.

A pedestal disclosed in Jpn. Pat. Appln. KOKAI Publication No. 2007-322512 has an eye-like coupling member which is screwed into the pedestal. A restraining wire runs between this coupling member and a hook secured to a wall, thereby preventing a liquid crystal television supported by the pedestal from toppling.

Such an anti-topple restraint may be fitted to a catch in order to reduce the number of components. The catch projects from, for example, the base of the pedestal. The anti-topple restraint has an opening in which the catch can be engaged in order to attach the anti-topple restraint to the pedestal.

To improve the appearance of the television, a glass plate is used in the manufacture of the pedestal. The glass plate is fixed a supporting unit and rubber feet. The supporting unit supports the television proper.

However, it is difficult to provide an anti-topple restraint coupling on the pedestal comprising a glass plate, even if the conventional structure of television pedestals is applied to such a glass plate. For instance, the aforementioned catch provided on the glass plate may be broken off by a force applied thereto.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a television includes a display, a supporting member, a cover member and an attaching member. The display has a display screen which displays an image. The supporting member supports the display. The cover member is attached the supporting member. The attaching member consists of parts different from those of the supporting member. The attaching member is attached to the cover member at a position that is different from a position at which the supporting member is attached. And an anti-topple restraint is attached to the attaching member.

In the following, a first embodiment will be explained with reference to FIGS. 1 to 11. In this specification, the side nearest the user is defined as the front; that furthest from the user, the rear; that to the left of the user, the left; that to the right of the user, the right; that facing upward relative to the user, up; and that facing downward relative to the user, down.

Figure 1:
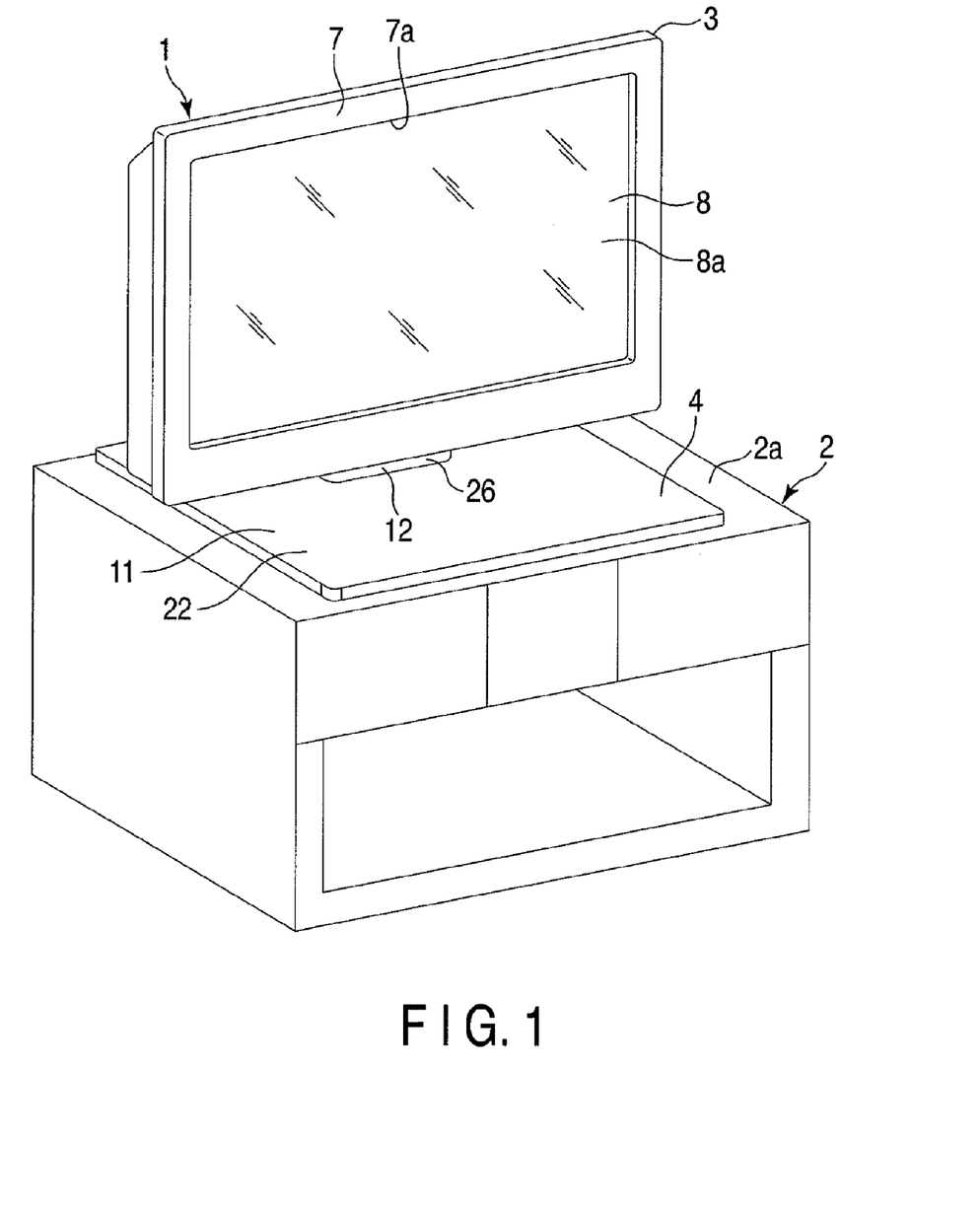
FIG. 1 is an exemplary front perspective view of a liquid crystal television according to a first embodiment.
Figure 2:
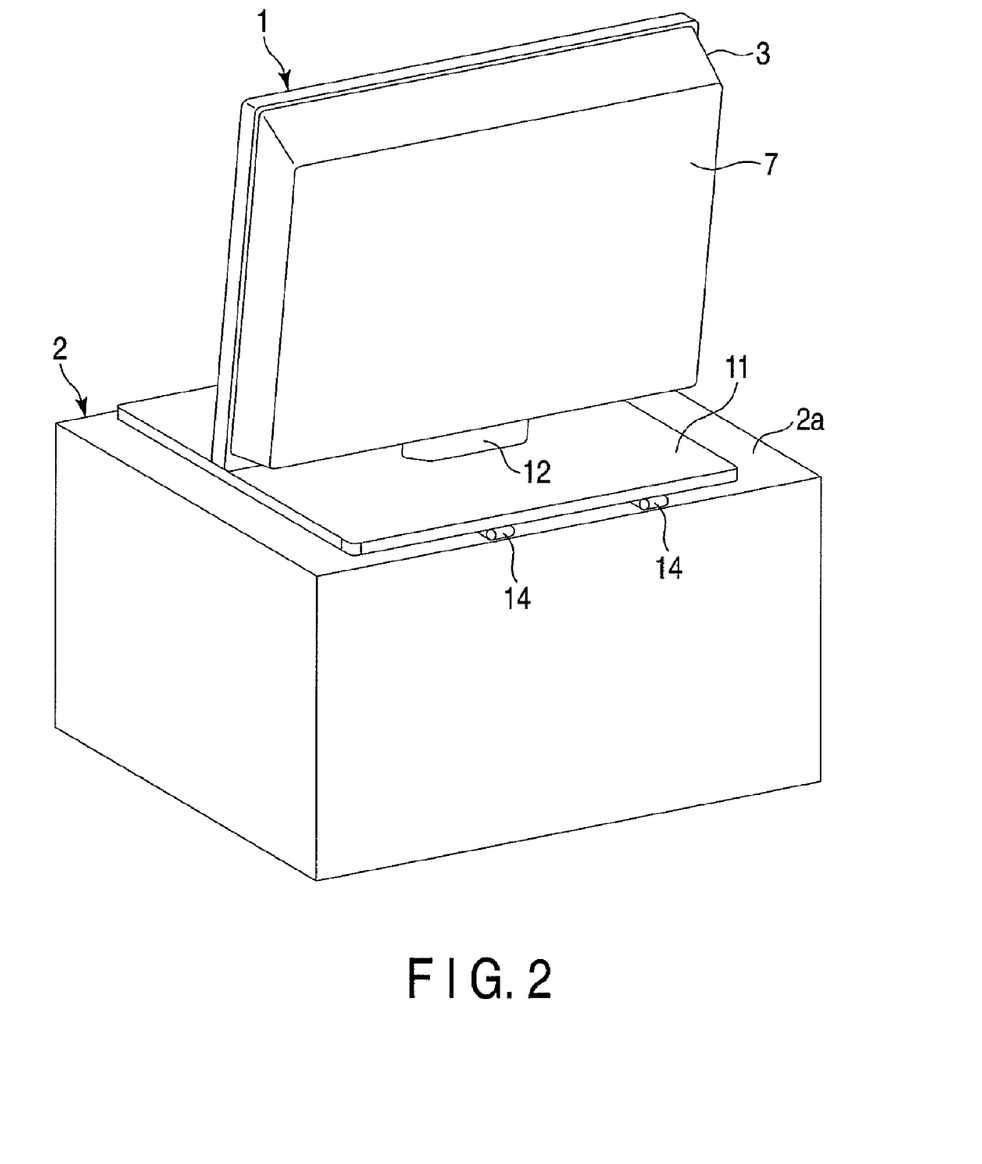
FIG. 2 is an exemplary rear perspective view of the liquid crystal television according to the first embodiment.

FIG. 1 is a front perspective view of a liquid crystal television 1 according to the first embodiment. FIG. 2 is a rear perspective view of the liquid crystal television 1. The liquid crystal television 1 is an example of an electronic device. As illustrated in FIG. 1, the liquid crystal television 1 is placed on a seating surface 2a of a television base 2, for example. The liquid crystal television 1 comprises a television proper 3 and a pedestal 4. The television proper 3 is an example of the display.

The television proper 3 comprises a flat housing 7 and a liquid crystal display panel 8. The liquid crystal display panel 8 is accommodated in the housing 7. The liquid crystal display panel 8 comprises a display screen 8a to display images. The display screen 8a is exposed to the outside of the housing 7 through a display aperture 7a provided in housing 7. The television proper 3 further comprises a television tuner and speakers, and is connected to a plurality of cables.

Figure 3:
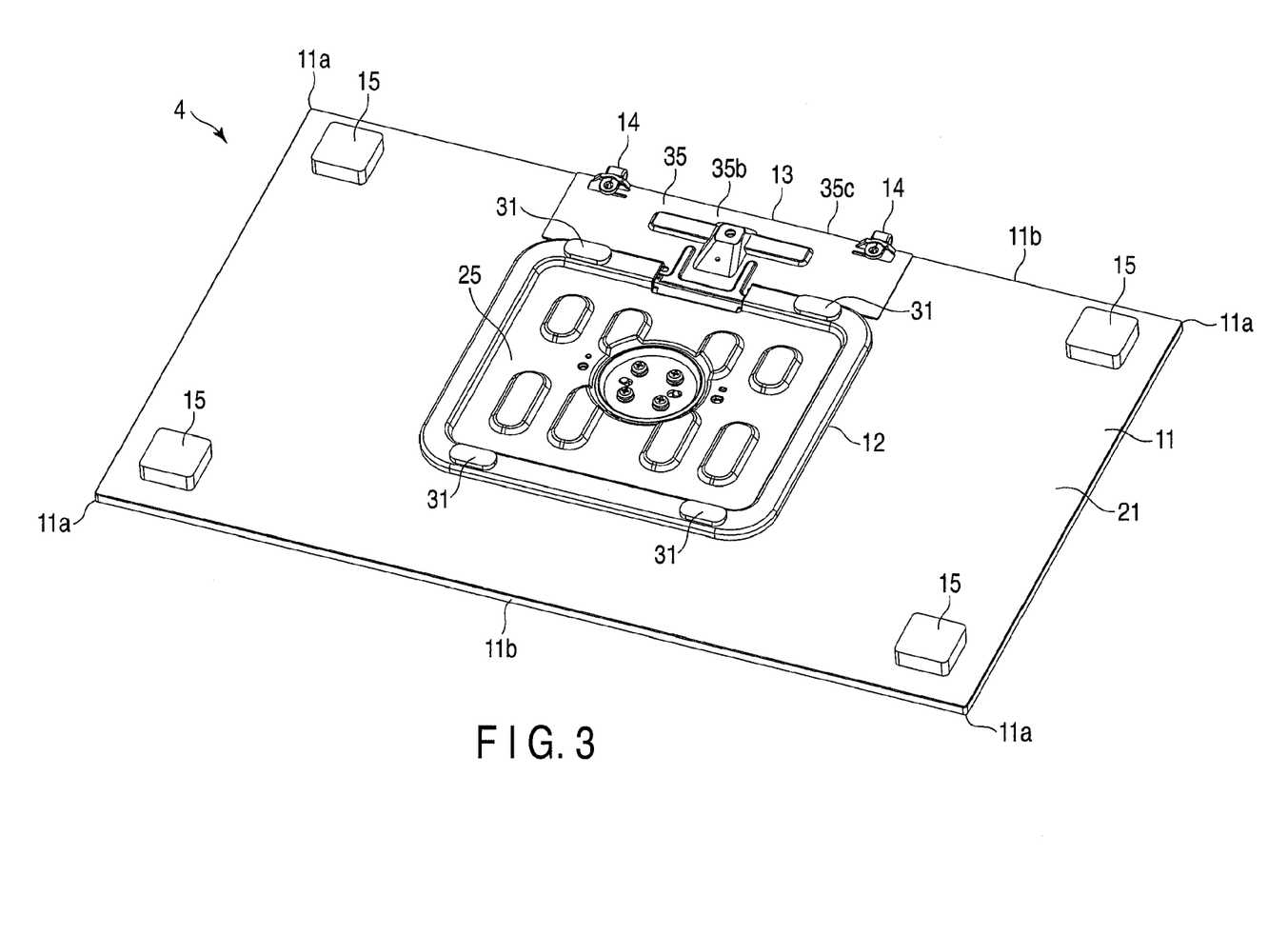
FIG. 3 is an exemplary perspective view from below of a pedestal according to the first embodiment.

FIG. 3 is a perspective view from below of the pedestal 4. As illustrated in FIG. 3, the pedestal 4 comprises a cover member 11, a supporting member 12, an attaching member 13, a pair of anti-topple restraints 14, and four first rubber feet 15. The supporting member 12, the attaching member 13 and the first rubber feet 15 are attached to the cover member 11. The pair of anti-topple restraints 14 are attached to the attaching member 13.

Figure 4:
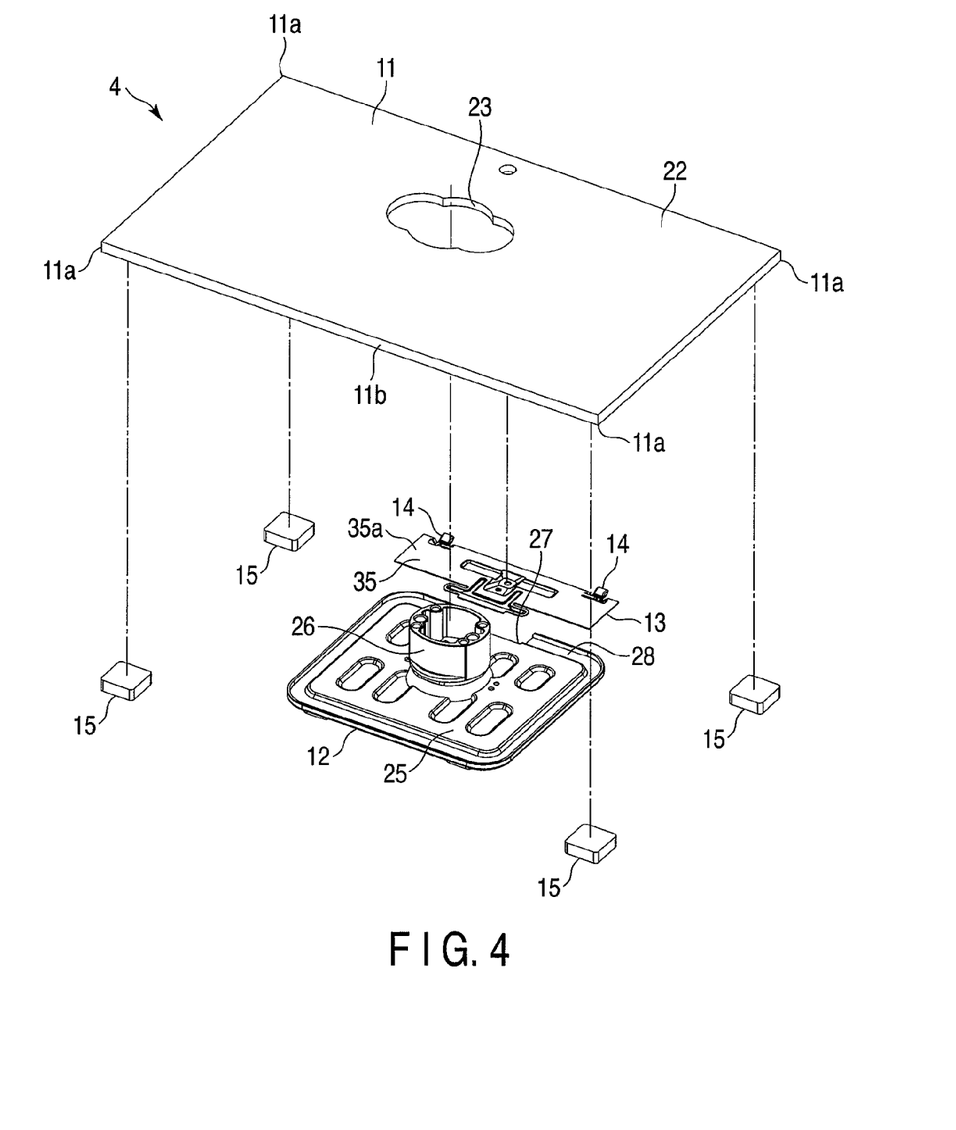
FIG. 4 is an exemplary perspective view of the dismantled pedestal according to the first embodiment.

FIG. 4 is a perspective view of the dismantled pedestal 4. The cover member 11 is a rectangular glass plate. The underside of the cover member 11 constitutes a first surface 21 and the topside of the cover member 11 constitutes a second surface 22. The first surface 21 faces the seating surface 2a of the television base 2. As illustrated in FIG. 1, the second surface 22 faces the television proper 3. The first surface 21 of the cover member 11 is coated to make it opaque, for example. The cover member 11 is provided with a pillar hole 23.

The first surface 21 and second surface 22 communicate via the pillar hole 23. The first rubber feet 15 are fixed to the first surface 21 with, for example, double-sided adhesive tape. Each of the first rubber feet 15 is arranged at each corner 11a of the cover member 11. The first rubber feet 15 contact the seating surface 2a and support the cover member 11.

The supporting member 12 comprises a baseplate 25 and a supporting pillar 26. The baseplate 25 is provided with a recess 27 and a channel 28 running along the edge of the baseplate 25. The baseplate 25 is fixed to the first surface 21 of the cover member 11 with, for example, double-sided adhesive tape. In other words, the first surface 21 covers the channel 28, thereby forming a space opening to the recess 27 therebetween.

As illustrated in FIG. 3, four second rubber feet 31 are attached for the baseplate 25. The second rubber feet 31 are fixed to the baseplate 25 with, for example, double-sided adhesive tape. The second rubber feet 31 contact the seating surface 2a to support the supporting member 12. They also support the cover member 11 to which the supporting member 12 is attached.

As illustrated in FIG. 4, a supporting pillar 26 projects from the baseplate 25. The supporting pillar 26 passes through the pillar hole 23 of the cover member 11. Consequently, as illustrated in FIG. 1, the supporting pillar 26 projects from the first surface 21 of the cover member 11. The supporting pillar 26 is fixed to the television proper 3 with a fixing means, such as a screw. The supporting member 12 supports the fixed television proper 3.

The supporting pillar 26 rotates on its axis on the baseplate 25. Since the television proper 3 is fixed to the supporting pillar 26, the television proper 3 rotates with the supporting pillar 26.

Figure 5:
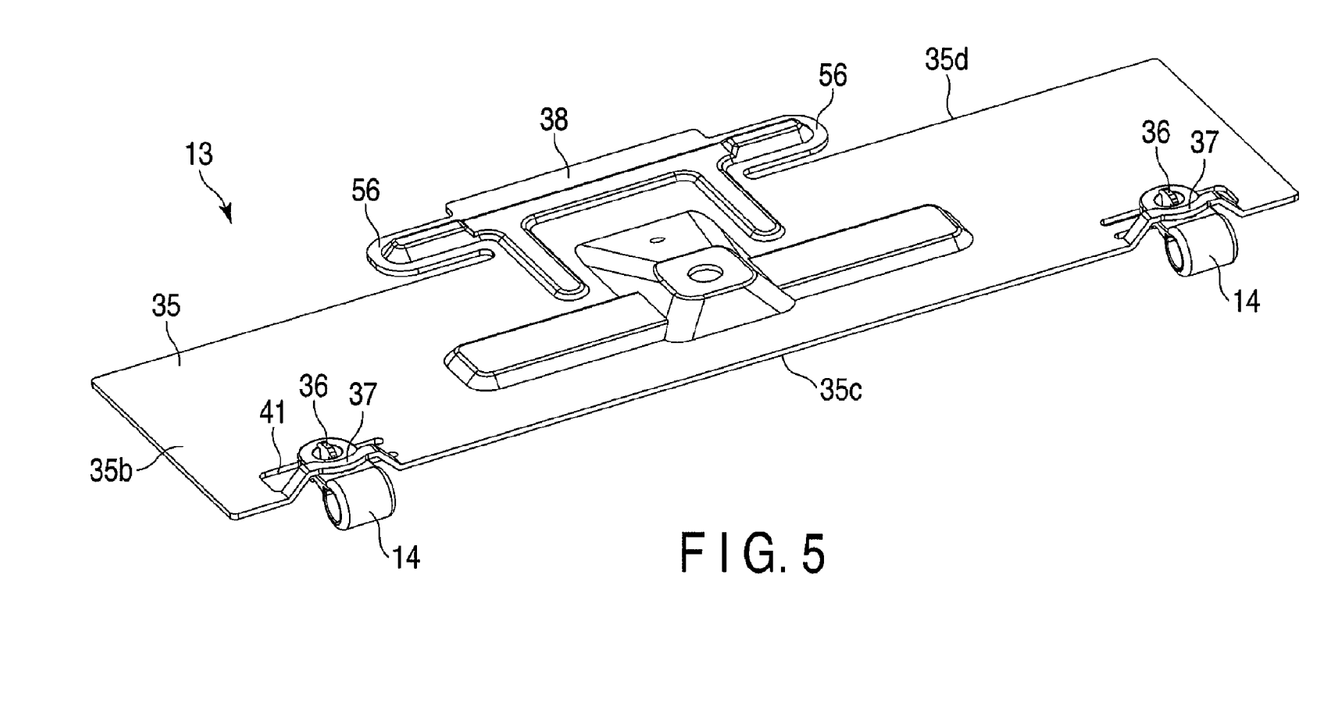
FIG. 5 is an exemplary perspective view from below of an attaching member according to the first embodiment.

FIG. 5 is a perspective view from below of the attaching member 13, to which the anti-topple restraints 14 are attached. The attaching member 13 and the supporting member 12 are separate parts. The attaching member 13 comprises a base 35, a pair of catches 36, a pair of holding members 37, and a mating member 38. The topside of the base 35 constitutes a first surface 35a, and the underside of the base 35 constitutes a second surface 35b. The two long edges of the base 35 constitute a rear edge 35c and a front edge 35d.

As shown in FIG. 4, the first surface 35a of the base 35 is fixed to the first surface 21 of the cover member 11 by, for example, double-sided adhesive tape, without overlapping with the supporting member 12. In other words, the first surface 35a is fixed to the first surface 21 at a position that is different from a position at which the supporting member 12 is attached. As shown in FIG. 3, the base 35 is located in such a manner that the rear edge 35c of the base 35 is aligned with the edge 11b of the cover member 11.

Figure 6:
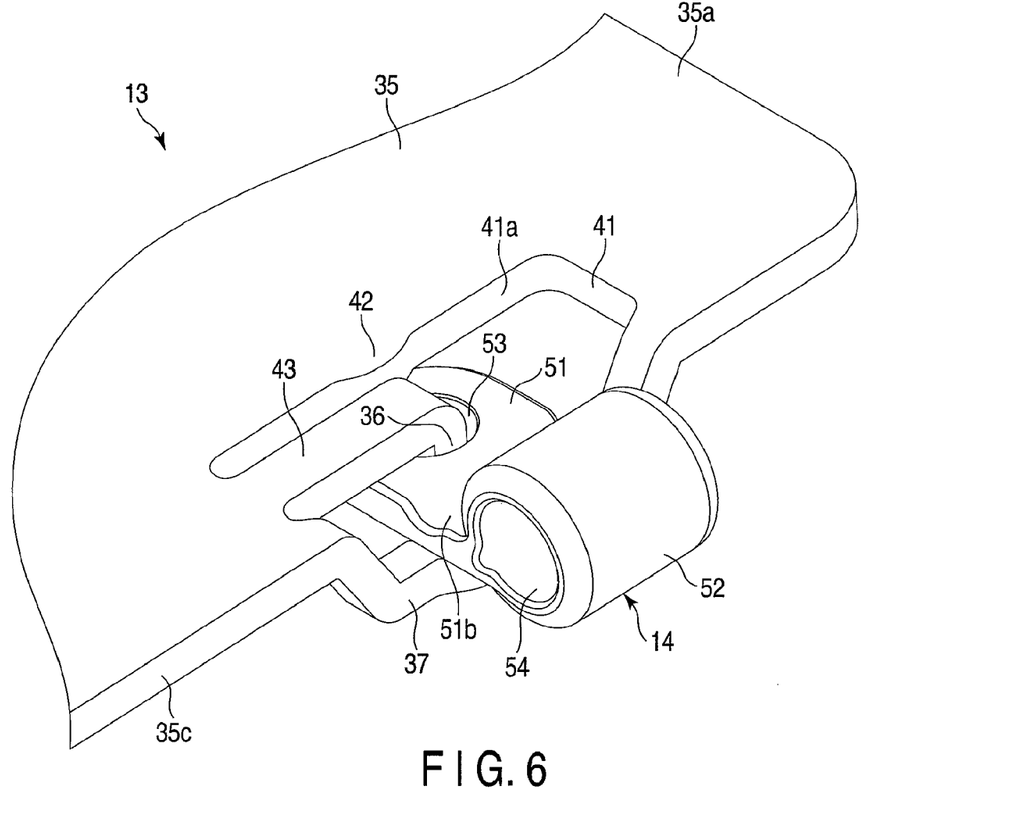
FIG. 6 is an exemplary enlarged perspective view from above of the attaching member according to the first embodiment.
Figure 7:
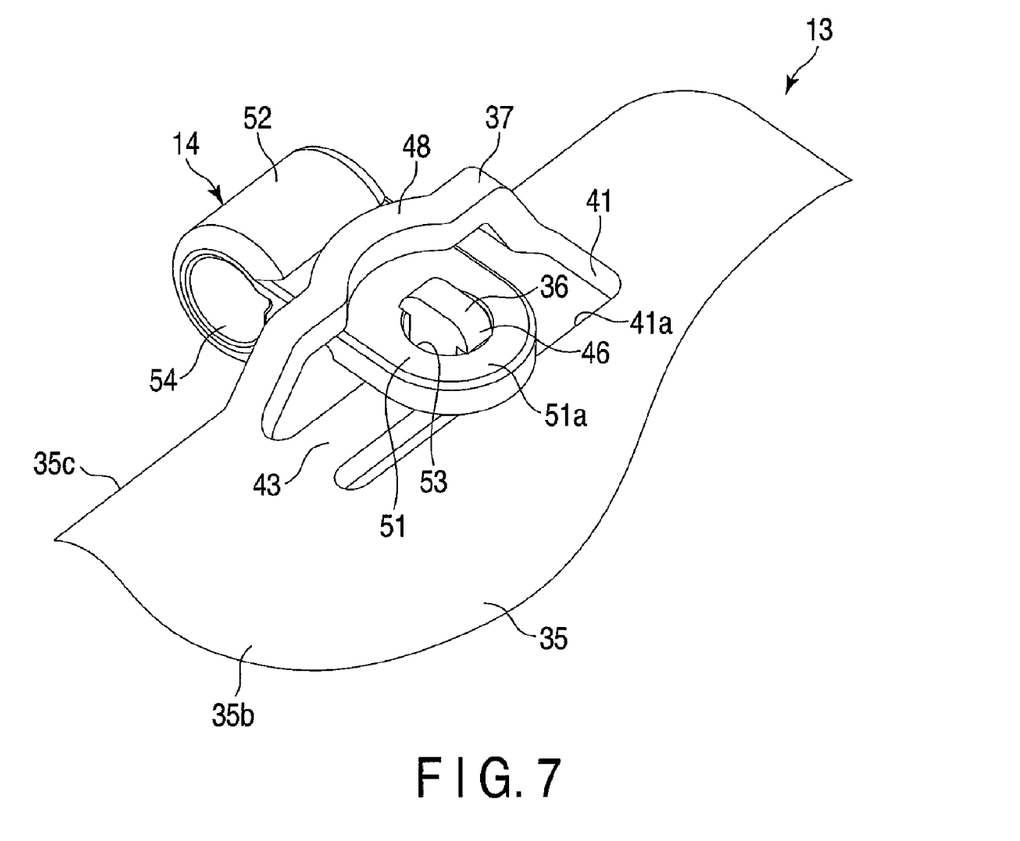
FIG. 7 is an exemplary enlarged perspective view from below of the attaching member according to the first embodiment.
Figure 8:
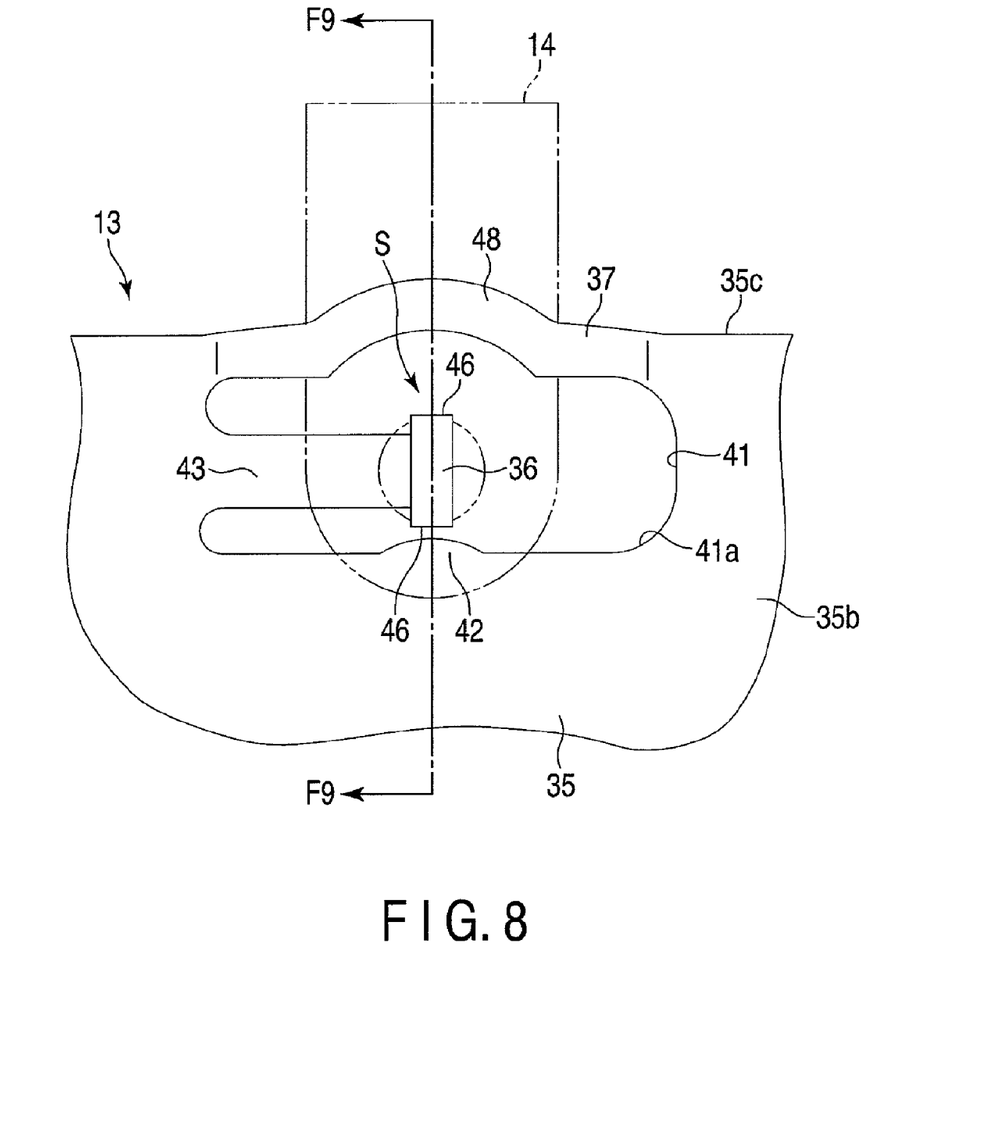
FIG. 8 is an exemplary plan view of a part of the attaching member according to the first embodiment.

FIG. 6 is an enlarged perspective view from above of the attaching member 13. FIG. 7 is an enlarged perspective view from below of the attaching member 13. FIG. 8 is a plan view of a part of the attaching member 13. As shown in FIG. 8, the base 35 is provided with an opening 41, which is located near to the rear edge 35c of the base 35.

The base 35 comprises a projecting part 42 and a latching member 43. The projecting part 42 projects from an inner edge 41a of the base 35 that defines the opening 41 toward the rear edge 35c. The latching member 43 extends from the edge 41a. The catch 36 is provided at the tip of the latching member 43.

Figure 9:
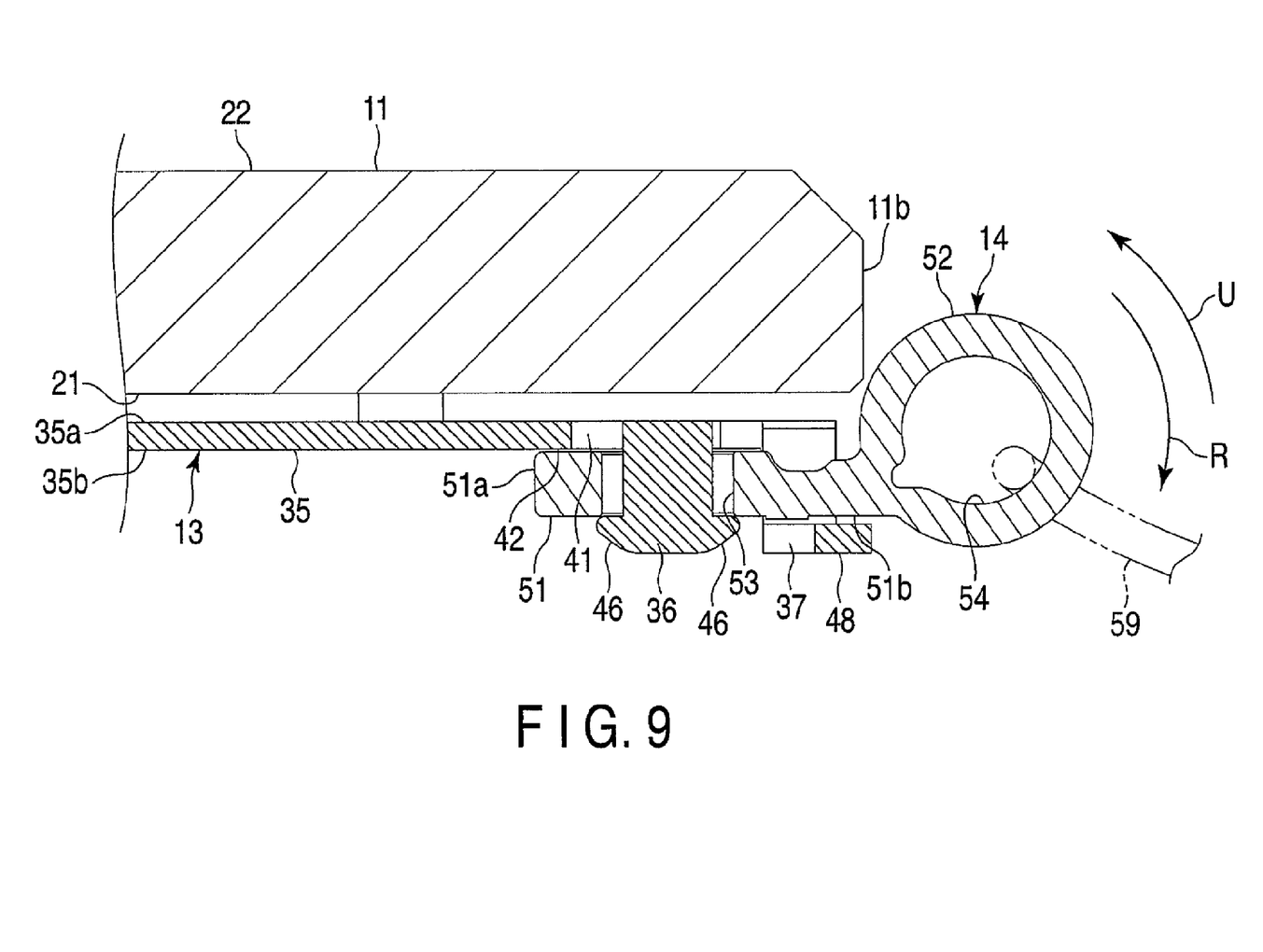
FIG. 9 is an exemplary sectional view taken along line F9-F9 of FIG. 8.

FIG. 9 is a sectional view of the attaching member 13 and the anti-topple restraint 14, taken along line F9-F9 of FIG. 8. As shown in FIG. 9, the catch 36 is located between the holding member 37 and the base 35. The catch 36 projects from the tip of the latching member 43 toward the second surface 35b of the base 35. In other words, the catch 36 projects from the base 35 in a direction opposite to the cover member 11. The catch 36 is formed by bending a part of the latching member 43.

A pair of engaging parts 46 is provided at the tip of the catch 36. Each of the engaging parts 46 protrudes in the direction of the rear edge 35c and the direction of the front edge 35d, respectively. The engaging parts 46 are tapered.

As shown in FIG. 9, the holding member 37 projects from the base 35 toward the second surface 35b of the base 35. As shown in FIG. 8, the holding member 37 is continuous with the rear edge 35c of the base 35. For this reason, the holding member 37 is located nearer to the edge 11b of the cover member 11 than the catch 36 is. The holding member 37 forms the opening 41 in cooperation with the base 35.

The holding member 37 has a curved portion 48. The curved portion 48 bends outward, thereby increasing the space S between the curved portion 48 and the catch 36.

As shown in FIG. 6, the anti-topple restraint 14 comprises a flat part 51 and a cylindrical part 52. The anti-topple restraint 14 is formed by bending, for example, a ferrous strip into an eye shape. As shown in FIG. 9, the flat part 51 has a first end 51a and a second end 51b. The cylindrical part 52 is arranged at the second end 51b. The flat part 51 is provided with an engagement hole 53. The cylindrical part 52 is provided with a restraint hole 54.

The size of the engagement hole 53 is suitable for inserting the catch 36 thereinto. The diameter of the engagement hole 53 is slightly less than the width of the engaging parts 46. The anti-topple restraint 14 is attached to the catch 36 by fitting the catch 36 into the engagement hole 53. The diameter of the engagement hole 53 is greater than the width of the catch 36. For this reason, the anti-topple restraint 14 can move slightly.

As shown in FIG. 9, when the anti-topple restraint 14 is attached to the catch 36, the first end 51a of the flat part 51 overlays the projecting part 42 of the base 35, and the second end 51b overlays the holding member 37. Thus, the anti-topple restraint 14 is retained between the holding member 37 and the base 35.

Since the width of the engaging parts 46 is slightly greater than the diameter of the engagement hole 53, the engaging parts 46 can secure the anti-topple restraint 14. Further, the anti-topple restraint 14 is retained between the engaging parts 46 and the projecting part 42 of the base 35.

As shown in FIG. 5, the mating member 38 extends from the front edge 35d of the base 35. The mating member 38 has a pair of engaging parts 56 which extend along the front edge 35d. The pair of engaging parts 56 engage with the channel 28.

When the supporting member 12 and the attaching member 13 are attached to the cover member 11, a space is formed between the cover member 11 and the channel 28. Consequently, the engaging parts 56 are inserted into this space.

The way of attaching the anti-topple restraint 14 to the catch 36 will be described below.

Figure 10:
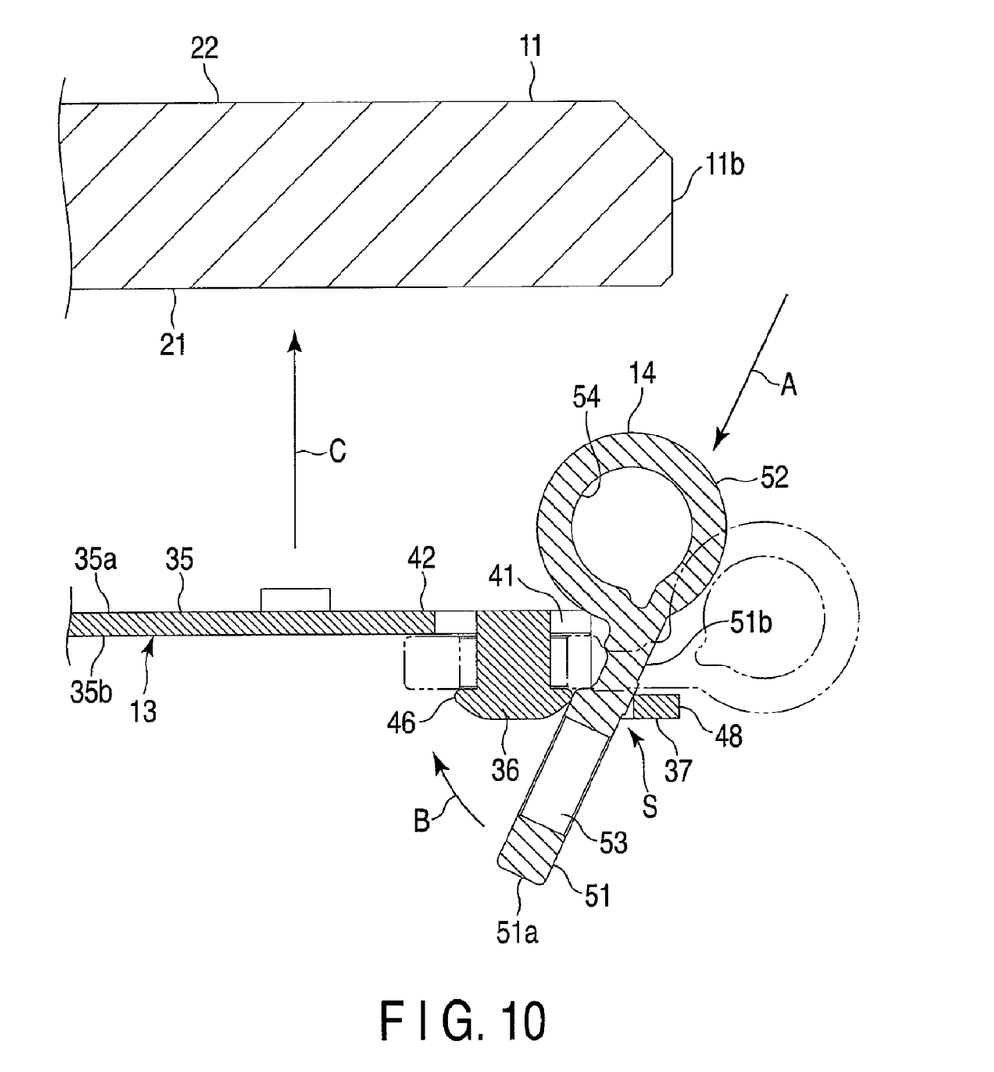
FIG. 10 is an exemplary explanatory drawing illustrating how the anti-topple restraint is attached according to the first embodiment.

FIG. 10 is a sectional view illustrating how the anti-topple restraint 14 is attached. As shown in FIG. 10, the anti-topple restraint 14 is inserted into the space S between the catch 36 and the holding member 37 in the direction of arrow A in FIG. 10. Arrow A indicates the direction from the upper side of the base 35 to the space S between the catch 36 and the holding member 37.

After being inserted into the space S, the anti-topple restraint 14 is pushed in the direction of arrow B in FIG. 10, thereby the catch 36 fits to the engagement hole 36 of the anti-topple restraint 14. Since the engaging parts 46 are tapered, the catch 36 can pass through the engagement hole 53.

Once the catch 36 fits into the engagement hole 53 of the anti-topple restraint 14, the anti-topple restraint 14 is secured by the engaging parts 46. Thus, the anti-topple restraint 14 is retained by the catch 36.

After the attachment, the attaching member 13 is mated with the cover member 11 in such a manner that the first surface 35 faces the first surface 21 of the base 35, as indicated by arrow C in FIG. 10. As shown in FIG. 9, once the attaching member 13 is mated with the cover member 11, the anti-topple restraint 14 is retained between the cover member 11 and the holding member 37. Further, the anti-topple restraint 14 is retained between the cover member 11 and the engaging parts 46.

Figure 11:
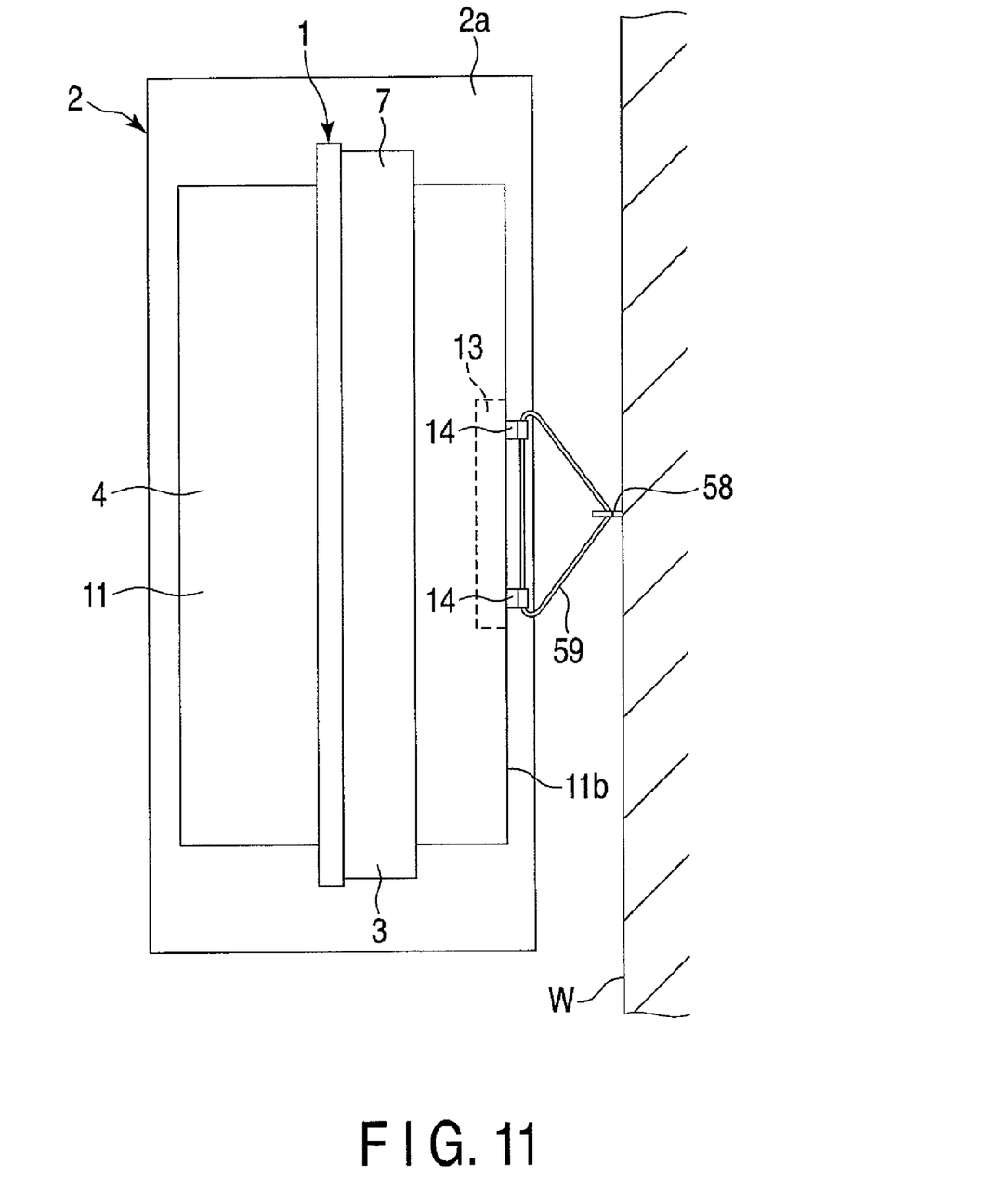
FIG. 11 is an exemplary explanatory drawing illustrating how the anti-topple restraint is used according to the first embodiment.

FIG. 11 is a plan view of the liquid crystal television 1 illustrating how the anti-topple restraint 14 is used. As shown in FIG. 11, a hook 58 is driven into a wall W behind the liquid crystal television 1.

The pair of anti-topple restraints 14 are linked to the hook 58 by a restraining wire 59. The restraining wire 59 passes through restraint holes 54 of the pair of anti-topple restraints 14 and over the hook 58. A cord may be used instead of the restraining wire 59.

Since the pair of anti-topple restraints 14 are linked to the hook 58 by the restraining wire 59, the liquid crystal television 1 is anchored to the wall W by the restraining wire 59. Because of this, the liquid crystal television 1 can be prevented from toppling in the event of an earthquake, etc.

According to the liquid crystal television 1 having above structure, the attaching member 13 is attached to the cover member 11 made of glass, and the anti-topple restraint 14 is attached to the attaching member 13. Accordingly, even when the cover member 11, which forms the greater part of the pedestal 4, is made of glass, it is still possible to attach the anti-topple restraint 14 to the pedestal 4.

The material used for the cover member 11 is not limited to glass. The attaching member 13 can be attached to a cover member 11 made of various materials, such as acrylic plastic or wood. The anti-topple restraint 14 can be attached to the cover member 11, regardless of the material of the cover member 11. Thus, the liquid crystal television 1 can be prevented from toppling.

The attaching member 13 and the supporting member 12 are two separate parts. Accordingly, the same attaching member 13 and supporting member 12 can be attached to a variety of cover member 11 of various sizes. Thus, the cost of manufacturing the liquid crystal television can be reduced.

The supporting member 12 and the attaching member 13 are fixed to the first surface 21 opposite to the seating surface 2a. By placing the liquid crystal television 1 on the seating surface 2a of the television base 2, the attaching member 13 and the supporting member 12 are hidden under the cover member 11, thereby improving the appearance of the liquid crystal television 1.

The catch 36 projects in the direction opposite to the cover member 11. Thus, the tip of the catch 36 does not touch the cover member 11, stress from the catch 36 is eliminated.

The anti-topple restraint 14 is attached to the catch 36 by marrying the catch 36 with the engagement hole 53, thereby a component for attaching the anti-topple restraint 14 to the attaching member 13 becomes unnecessary, and thus the number of components can be reduced.

The flat part 51 of the anti-topple restraint 14 is retained between the holding member 37 and the base 35. In the event of an earthquake, for example, the anti-topple restraint 14 is pulled by the restraining wire 59 in the direction of arrow R in FIG. 9. If pulled, the holding member 37 and the base 35 receive the anti-topple restraint 14. Thus, the anti-topple restraint 14 is prevented from disengaging from the catch 36.

The catch 36 is arranged between the holding member 37 and the base 35. Thus, when the anti-topple restraint 14 is pulled in the direction of arrow R, the holding member 37 and the base 35 effectively receive the anti-topple restraint 14.

The curved part 48 of the holding member 37 curves in a direction opposite to the catch 36, so that a sufficient space is saved for the space S between the catch 36 and the holding member 37. The large space S makes it easier to attach the anti-topple restraint 14 to the catch 36.

The engaging parts 46 restrain the anti-topple restraint 14 in order to prevent the anti-topple restraint 14 from disengaging from the catch 36. Further, the anti-topple restraint 14 is retained between the engaging parts 46 and the base 35. When the anti-topple restraint 14 is pulled in the direction of arrow R in the event of an earthquake for example, the engaging parts 46 and the holding member 37 is received the anti-topple restraint 14. The anti-topple restraint 14 is prevented from disengaging from the catch 36.

The engaging parts 46 extend toward each of the outer edge 35c of the base 35 and the projecting part 42. In other words, the engaging parts 46 protrude in such a direction that the force produced when the engaging parts 46 receive the anti-topple restraint 14 is absorbed. Thus, the engaging parts 46 effectively receive with the anti-topple restraint 14.

When a force is applied to the anti-topple restraint 14 in the direction of arrow U in FIG. 9, the engaging parts 46 and the cover member 11 receive the anti-topple restraint 14. Arrow U is in the opposite direction to arrow R. Since the anti-topple restraint 14 is received by the engaging parts 46 and the cover member 11, the anti-topple restraint 14 can be prevented from disengaging from the catch 36, even when the anti-topple restraint 14 is pulled in the direction of arrow U.

Each of the engaging parts 56 of the mating member 38 is inserted into a space between the channel 28 and the cover member 11. In the event of the double-sided adhesive tape which fixes the attaching member 13 to the cover member 11 coming off, the engaging parts 56 remain engaged with the channel 28. Accordingly, the attaching member 13 is prevented from coming off the cover member 11.

The projecting part 42 extends from the edge 41a that defines the opening 41. The first end 51a of the flat part 51 overlays the projecting part 42 of the base 35. Thus, a portion of the base 35 to receive the anti-topple restraint 14 becomes larger in an event such as an earthquake.

Next, the second embodiment will be explained with reference to FIGS. 12 and 13. In the explanation, explanations of the structures having the same function as the liquid crystal television 1 according to the first embodiment will be omitted by indicating the same reference numbers.

Figure 12:
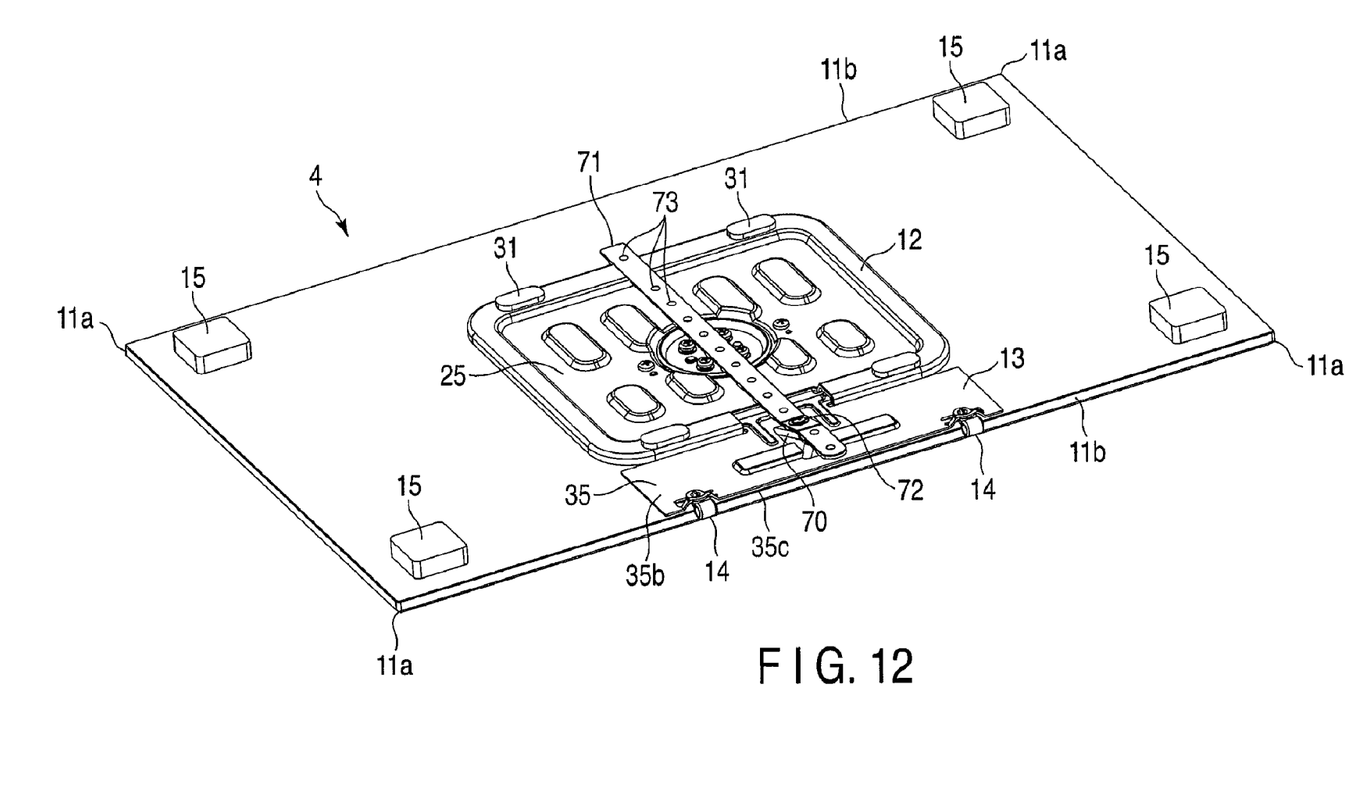
FIG. 12 is an exemplary perspective view from below of a pedestal according to a second embodiment.

FIG. 12 is a perspective view from below of a pedestal 4. As shown in FIG. 12, a protuberance 70 is provided on a base 35 of an attaching member 13. The protuberance 70 protrudes from a second surface 35b of the base 35.

An anti-topple restraint 71 is attached to the protuberance 70. The anti-topple restraint 71 is fixed to the protuberance 70 by a first fixing means 72 in the form of a screw. The anti-topple restraint 71 is a flexible strap and is provided with a plurality of fixing holes 73 along its length.

Figure 13:
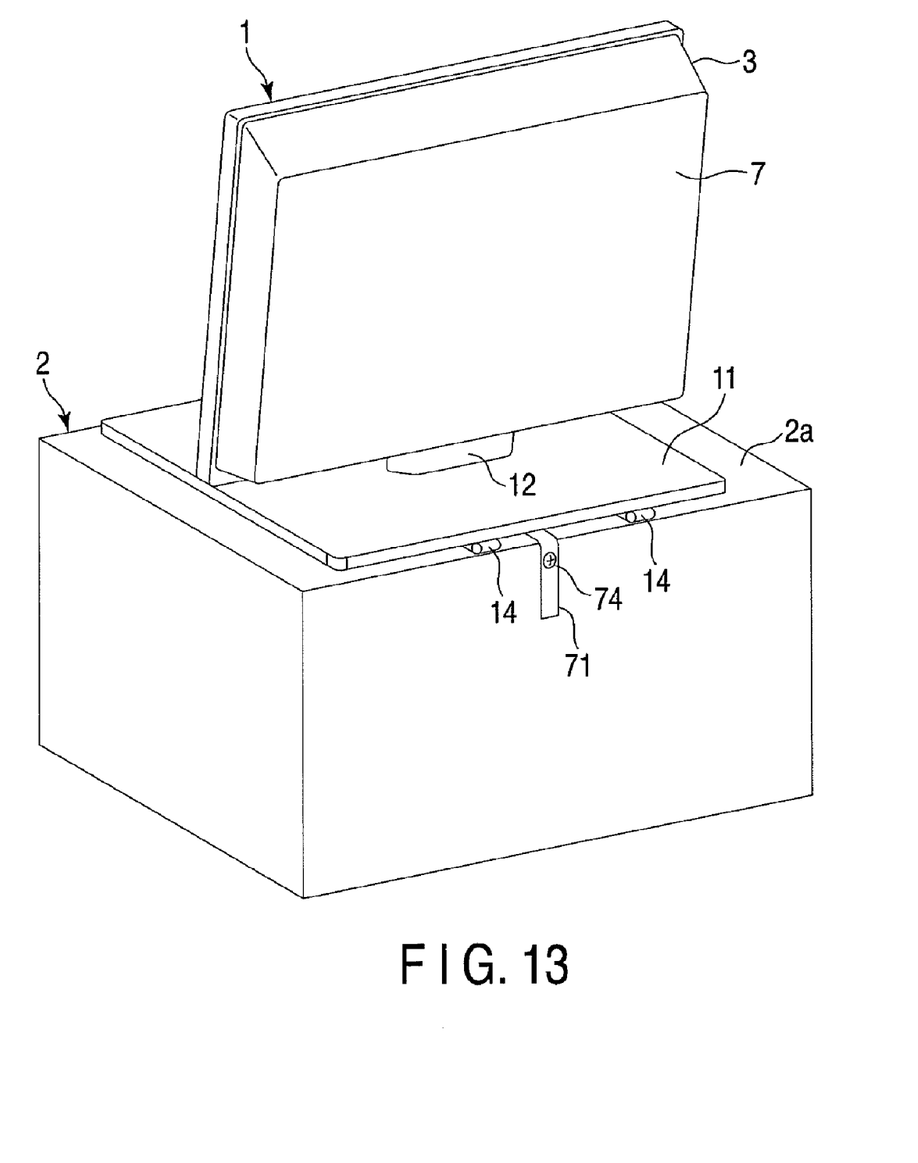
FIG. 13 is an exemplary rear perspective view of a liquid crystal television according to the second embodiment.

FIG. 13 is a rear perspective view of a television to show how the anti-topple restraint 71 is used. The anti-topple restraint 71 is rotated from the stowed position shown in FIG. 12 to the deployed position shown in FIG. 13. As shown in FIG. 13, the anti-topple restraint 71 in the deployed position extends over the edge 11b of a cover member 11.

The anti-topple restraint 71 in a deployed position is attached to a television base 2 by a second fixing means 74. As the second fixing means, a wood screw is used, for example. The second fixing means 74 secures the anti-topple restraint 71 to the television base 2 through a fixing hole 73.

When a pair of eye-like anti-topple restraints 14 are used instead of the strap-like anti-topple restraint 71, the anti-topple restraint 71 is positioned in a stowed position. As shown in FIG. 12, the anti-topple restraint 71 in the stowed position is located inward of the edge 11b of the cover member 11.

According to the liquid crystal television 1 having the above structure, not only a pair of eye-like anti-topple restraints 14 but also a strap-like anti-topple restraint 71 are attached to the attaching member 13. Thus, toppling of the liquid crystal television 1 is prevented by securing the anti-topple restraint 71 to, for example, the television base 2.

The present invention is not limited to the aforementioned embodiments, and various modifications can be made within the scope of the concept of the invention to carry out the invention. For example, the present invention is applicable to a display of a personal computer as well as to a liquid crystal television.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television comprising:
a display comprising a display screen configured to display an image;
a support configured to support the display;
a cover comprising a first surface to which the support is attached and a second surface on an opposite side of the first surface and facing the display; and
an attaching portion which consists of parts different from those of the support,
wherein the attaching portion is attached to the first surface of the cover, wherein the attaching portion has a catch, and wherein an anti-topple restraint comprising an engagement hole to which the catch is fitted into is attached to the attaching portion.

2. The television of claim 1, wherein the attaching portion comprises a base attached to the cover, and wherein the catch is projecting from the base in the direction opposite to the cover.

3. The television of claim 2, wherein the attaching portion comprises a holder and wherein the anti-topple restraint is retained between the holder and the base.

4. The television of claim 3, wherein the catch is arranged at a position between the holder and the base.

5. The television of claim 3, wherein the holder comprises a curved portion winding in a direction away from the catch.

6. The television of claim 2, wherein the catch comprises an engaging portion configured to retain the anti-topple restraint between the engaging portion and the base.

7. A pedestal comprising:
a support configured to support a display for displaying images;
a cover comprising a first surface to which the support is attached and a second surface on an opposite side of the first surface; and
an attaching portion which consists of parts different from those of the support, wherein the attaching portion is attached to the first surface of the cover, wherein the attaching portion has a catch, and wherein an anti-topple restraint comprising an engagement hole to which the catch is fitted into is attached to the attaching portion.

8. An electronic device comprising:
a support configured to support a display for displaying images;
a cover comprising a first surface to which the support is attached and a second surface on an opposite side of the first surface; and
an attaching portion which consists of parts different from those of the support, wherein the attaching portion is attached to the first surface of the cover, wherein the attaching portion has a catch, and wherein an anti-topple restraint comprising an engagement hole to which the catch is fitted into is attached to the attaching portion.

* * * * *